(No Model.) 2 Sheets—Sheet 1.

F. G. DAVIS.
DEVICE FOR PACKING VEHICLE WHEELS.

No. 478,954. Patented July 12, 1892.

Witnesses:
Theo. L. Popp.
Emil Neuhart

Francis G. Davis,
Inventor.
By Wilhelm & Bonner,
Attorneys.

(No Model.) 2 Sheets—Sheet 2.

F. G. DAVIS.
DEVICE FOR PACKING VEHICLE WHEELS.

No. 478,954. Patented July 12, 1892.

Witnesses:
Theo. L. Popp
Emil Neuhart

Francis G. Davis, Inventor
By Wilhelm & Bonner
Attorneys.

UNITED STATES PATENT OFFICE.

FRANCIS G. DAVIS, OF WATERTOWN, NEW YORK.

DEVICE FOR PACKING VEHICLE-WHEELS.

SPECIFICATION forming part of Letters Patent No. 478,954, dated July 12, 1892.

Application filed January 11, 1892. Serial No. 417,628. (No model.)

*To all whom it may concern:*

Be it known that I, FRANCIS G. DAVIS, a citizen of the United States, residing at Watertown, in the county of Jefferson and State of New York, have invented a new and useful Improvement in Devices for Packing Vehicle-Wheels, of which the following is a specification.

This invention relates to a device for packing vehicle-wheels for transportation. Heretofore wheels have been packed in flat crates and separated from each other by cloth, paper, or other packing material, so as to prevent as much as possible one wheel from chafing or marring the other. Wheels have also been packed in circular crates and held therein by a tie-bolt passing through the hubs of all the wheels and fastened with its ends to the crate. In both these methods of packing wheels the surface of the wheels is abraded or marred during transportation, owing to the rubbing of the wheels against one another or against the packing material.

The object of my invention is to provide a device whereby the wheels are securely clamped together and held immovably out of contact with each other, thereby preventing the same from being marred.

Figure 1:
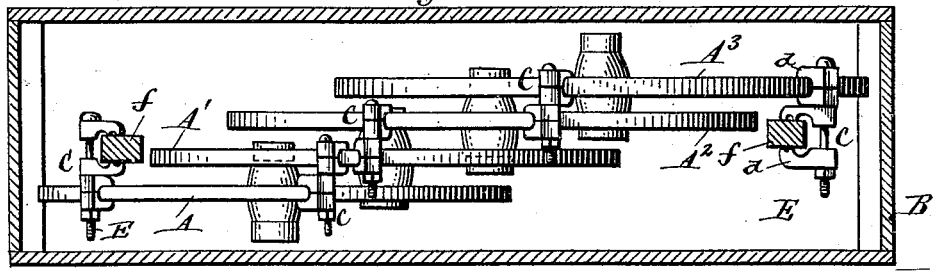
Figure 2:
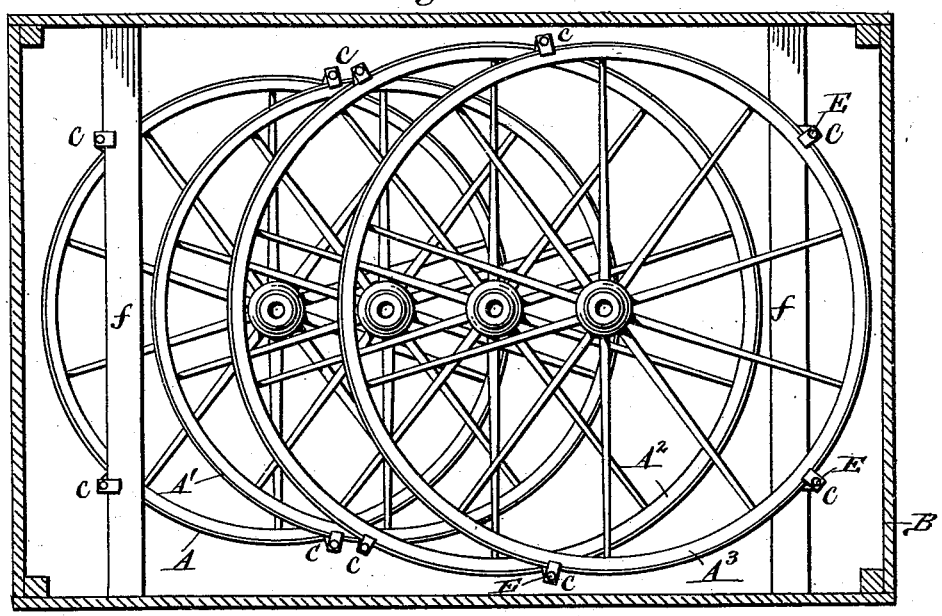
Figure 3:
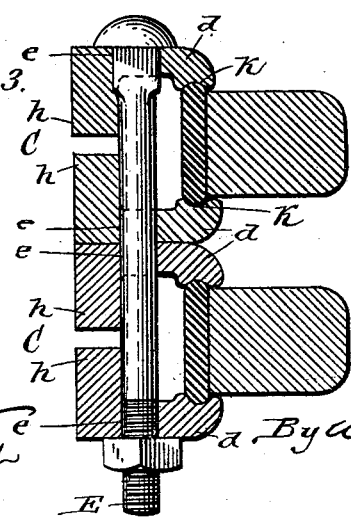
Figure 4:
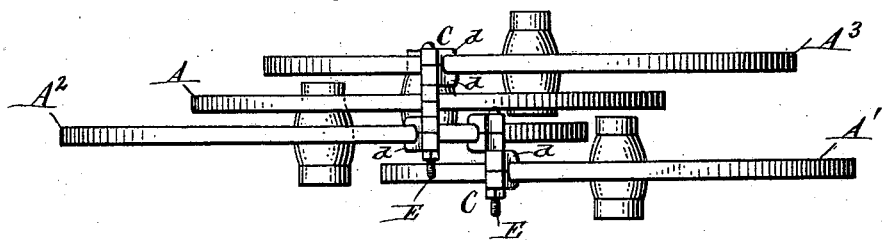
Figure 5:
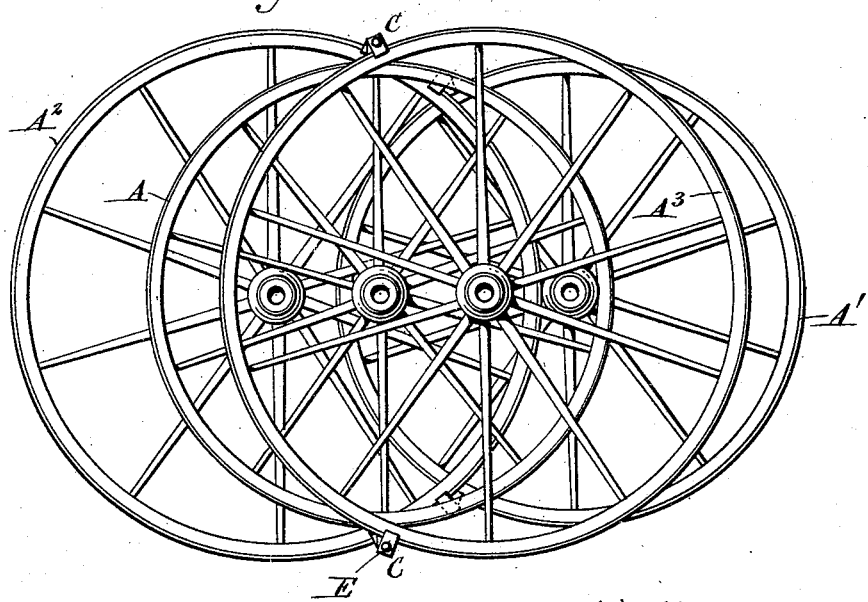
Figure 6:
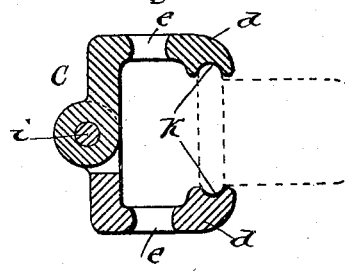
Figure 7:
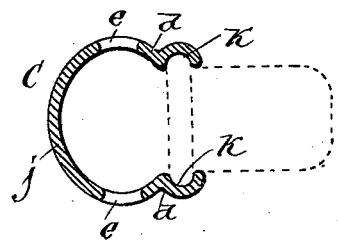

In the accompanying drawings, Figure 1 is a plan view of a set of wheels secured together by my improved clamping devices and arranged in a crate, which is shown in section. Fig. 2 is a side elevation of the set of wheels packed in the crate, the latter being shown in section. Fig. 3 is a section of the clamping device on an enlarged scale and of the rims of two wheels secured together thereby. Fig. 4 is a plan view of a set of wheels and clamping devices, illustrating another mode of packing a set of wheels by the use of my clamping devices. Fig. 5 is a side elevation of the same. Fig. 6 is a sectional elevation of one of the clamps on an enlarged scale, illustrating a modified construction thereof. Fig. 7 is a similar view showing another modification.

Like letters of reference refer to like parts in the several figures.

A A' A² A³ represent a set of wheels comprising the two small front wheels and the two large rear wheels of a vehicle. In packing the set of wheels the first wheel is placed flatwise in a crate B, and the second wheel is placed upon the first wheel, so that the hub of one wheel passes freely between two spokes of the other wheel. The third wheel is then placed upon the second wheel, so that the hub of one wheel passes between the spokes of the other, and the fourth wheel is then placed in like manner above the third, so that the several wheels are arranged in step fashion, as represented in Figs. 1 and 2.

C represents clamps whereby the wheels are secured together and held out of contact with each other. Each of these clamps consists of two jaws *d*, which are designed to bear with their biting-faces against the edges of the same tire or wheel-rim and which are drawn against the same by a tie-bolt E, which passes through holes *e* in the jaws. These clamps are arranged in groups of two or more pairs strung on the same tie-bolt, whereby the jaws of each clamp are tightened upon the tire or rim, and the clamps are tightened upon each other. The clamps are preferably applied to the wheels at the points where the rim of one wheel crosses over the rim of the other wheel.

In securing two wheels together a pair of clamping-jaws is arranged on opposite sides of each of the tires, and the tie-bolt is inserted into the openings of the jaws and tightened, whereby the biting-faces of the jaws are drawn against the edges of the tires, and the backs of the adjacent jaws of the two clamps are drawn against each other, as represented in Fig. 3, thereby firmly securing the wheels together and holding the spokes, fellies, and hubs of one wheel out of contact with those of the other. Each pair of jaws therefore grasps one of the wheels and is held at a distance from the other wheel by resting against the other jaw. In packing wheels in this fashion the first and second wheels are first secured together by a pair of clamps applied to the tires at each of the points where one rim crosses the other. The third wheel is then secured in like manner to the second and the fourth wheel to the third wheel. All four wheels are now rigidly held against movement upon each other and prevented from touching each other at any point. The wheels are preferably secured in the crate by clamping them to cross-bars *f*, secured in the crate. This is readily accomplished by connecting the end wheels of the set with the cross-bars by these clamps, as represented in Figs. 1 and 2; but, if desired, cross-bars may also be provided, to which the inner wheels of the set can be clamped. The set of wheels may, however, be variously arranged in the crate. For instance, as represented in Figs. 4 and 5, the wheels may be arranged so that the tires of three wheels cross each other at the same point, which permits these three tires to be fastened together on each side by three pairs of jaws connected by a tie-bolt, the fourth wheel being secured to the lowest one of the three by a separate pair of clamps.

The clamping-jaws may be constructed in various ways.

In Figs. 1 and 5 the clamping-jaws are made separate from each other and move in straight lines toward and from each other on the tie-bolt. The outer portions of the jaws of each clamp are also provided with toes or lugs $h$, which extend toward each other. Upon tightening the tie-bolt and drawing the biting-faces of the jaws against the rims these toes press against the back or outer side of the bolt and hold the clamps in position, as represented in Fig. 3.

In Fig. 6 the pair of jaws of the clamp are attached together by a hinge $i$. In Fig. 7 both jaws of the clamp are made out of a single piece of spring metal $j$, bent into the shape of a C.

In the several forms of clamping-jaws which are shown in the drawings the gripping-faces are provided with grooves $k$, which fit the edges of the tires. This construction is particularly desirable for transporting highly-finished wheels, which only permit of attaching the clamps to the tires. When the clamps are used for shipping wheels of inferior quality or unfinished wheels having no tires, the gripping-faces of the jaws may be made flat and bear against the sides of the fellies or rims.

I claim as my invention—

1. A clamping device for packing wheels, consisting of a series of connected movable jaws bearing against opposite sides of each wheel and capable of movement toward and from each other, thereby firmly grasping each wheel and also forming space-blocks between the wheels, whereby the wheels are held out of contact with each other, substantially as set forth.

2. A device for packing wheels, comprising several clamps, each of which consists of two jaws capable of movement toward and from each other and bearing against opposite sides of the same wheel, and a tightening device whereby the clamps are attached together and tightened upon the wheels, substantially as set forth.

3. The combination, with two clamps, each of which consists of two jaws adapted to embrace the rim of a wheel, and a tie-bolt passing through the jaws of both clamps and operating to tighten each pair of jaws upon the wheel-rim which is grasped by them and also attaching the two clamps together, substantially as set forth.

Witness my hand this 5th day of January, 1892.

FRANCIS G. DAVIS.

Witnesses:
F. P. HAYES,
H. P. BABCOCK.